(12) United States Patent
Kobayashi et al.

(10) Patent No.: US 9,460,862 B2
(45) Date of Patent: Oct. 4, 2016

(54) ELECTRIC STORAGE CELL, ELECTRIC STORAGE APPARATUS, AND VEHICLE HAVING ELECTRIC STORAGE APPARATUS

(75) Inventors: Shigemi Kobayashi, Higashimatsuyama (JP); Naomichi Koike, Okegawa (JP)

(73) Assignee: UD TRUCKS CORPORATION, Saitama (JP)

(*) Notice: Subject to any disclaimer, the term of this patent is extended or adjusted under 35 U.S.C. 154(b) by 519 days.

(21) Appl. No.: 13/991,277

(22) PCT Filed: Nov. 7, 2011

(86) PCT No.: PCT/JP2011/075623
§ 371 (c)(1),
(2), (4) Date: Jun. 3, 2013

(87) PCT Pub. No.: WO2012/073654
PCT Pub. Date: Jun. 7, 2012

(65) Prior Publication Data
US 2013/0252042 A1    Sep. 26, 2013

(30) Foreign Application Priority Data

Dec. 3, 2010 (JP) ................. 2010-270422

(51) Int. Cl.
*H01M 2/02* (2006.01)
*H01G 11/18* (2013.01)
(Continued)

(52) U.S. Cl.
CPC ............. *H01G 11/18* (2013.01); *H01G 2/10* (2013.01); *H01G 11/78* (2013.01); *H01G 11/82* (2013.01); *H01M 2/024* (2013.01); *H01M 2/0237* (2013.01); *H01M 2/1061* (2013.01);
(Continued)

(58) Field of Classification Search
CPC .. H01G 11/82; H01M 2/1061; H01M 2/024; H01M 10/613
See application file for complete search history.

(56) References Cited

U.S. PATENT DOCUMENTS 5,800,942 A * 9/1998 Hamada ............... B60K 1/04
429/120
6,304,057 B1   10/2001 Hamada et al.
(Continued)

FOREIGN PATENT DOCUMENTS

CN     1292575 A      4/2001
JP     2003-282375 A  10/2003
(Continued)

OTHER PUBLICATIONS

International Search Report corresponding to PCT/JP2011/075623, dated Jan. 31, 2013.
(Continued)

*Primary Examiner* — Barbara Gilliam
*Assistant Examiner* — Stephan Essex
(74) *Attorney, Agent, or Firm* — Hauptman Ham, LLP (57) ABSTRACT

An electric storage cell includes a hard casing configured to house an electric storage element and electrolyte, and an electrode terminal connected to a charge collector of the electric storage element and exposed to an outside of the hard casing, the electric storage cell being chargeable/dischargeable using the electrode terminal, wherein the electrode terminal has a charge collector connecting portion connected to the charge collector through an opening formed in the hard casing, and a main body bonded to an outer circumferential surface of the hard casing to make a surface contact.

10 Claims, 8 Drawing Sheets

(51) Int. Cl.
    *H01G 2/10*       (2006.01)
    *H01G 11/78*     (2013.01)
    *H01G 11/82*     (2013.01)
    *H01M 2/10*      (2006.01)
    *H01M 2/30*      (2006.01)
    *H01M 10/625*    (2014.01)
    *H01M 10/6553*   (2014.01)
    *H01M 10/6563*   (2014.01)
    *H01M 10/613*    (2014.01)

(52) U.S. Cl.
    CPC ............ *H01M2/1077* (2013.01); *H01M 2/30* (2013.01); *H01M 2/305* (2013.01); *H01M 10/613* (2015.04); *H01M 10/625* (2015.04); *H01M 10/6553* (2015.04); *H01M 10/6563* (2015.04); *H01M 2/0262* (2013.01); *H01M 2/0277* (2013.01); *H01M 2220/20* (2013.01); *Y02E 60/13* (2013.01); *Y02T 10/7022* (2013.01)

(56) References Cited

U.S. PATENT DOCUMENTS

| | | | |
|---|---|---|---|
| 2007/0184341 A1* | 8/2007 | Yoon | H01M 2/0207 429/152 |
| 2009/0169989 A1 | 7/2009 | Morikawa et al. | |
| 2010/0203376 A1 | 8/2010 | Choi et al. | |
| 2010/0276132 A1 | 11/2010 | Payne | |

FOREIGN PATENT DOCUMENTS

| | | |
|---|---|---|
| JP | 2004-335578 A | 11/2004 |
| JP | 2005-051074 A | 2/2005 |
| JP | 2008-085084 A | 4/2008 |

OTHER PUBLICATIONS

Office Action issued May 6, 2015, corresponding to Chinese patent application No. 201180058298.6.

* cited by examiner

ELECTRIC STORAGE CELL, ELECTRIC STORAGE APPARATUS, AND VEHICLE HAVING ELECTRIC STORAGE APPARATUS

RELATED APPLICATIONS

The present application is a National Phase of International Application Number PCT/JP2011/075623, filed Nov. 7,2011, and claims priority from Japanese Application Number 2010-270422 Dec. 3, 2010, filed Dec. 3, 2010.

TECHNICAL FIELD

This invention relates to a chargeable/dischargeable electric storage cell, an electric storage apparatus having the electric storage cell, and a vehicle having the electric storage apparatus.

BACKGROUND ART

In an electric storage element built in an electric storage cell, heat is generated along with charge/discharge operation. This heat is transferred through various paths around the electric storage cell, finally, to an air-cooled or liquid-cooled medium.

As a technique of radiating the heat in the electric storage cell to the outside, JP2003-282375A discloses an electric double layer capacitor housed in an exothermal hard casing using a heat-conductive chassis that interposes a heat radiation fin of a soft casing.

In addition, in JP2005-51074A, a fin is provided in a terminal protruding to the outside of the electric double layer capacitor.

SUMMARY OF THE INVENTION

In an electric storage cell mounted on a vehicle, compactification is desirable from the viewpoint of weight or layout. However, in the techniques disclosed in JP2003-282375A and JP2005-51074A, there is a problem in that since a space that does not contribute to a battery functionality around the electric storage cell increases, it is difficult to achieve the compactification.

This invention has been designed in consideration of these problems, and an object thereof is to provide an electric storage cell and an electric storage apparatus capable of effectively radiating the heat generated in the electric storage cell to the outside with a compact size.

According to one aspect of this invention, an electric storage cell including a hard casing configured to house an electric storage element and electrolyte, and an electrode terminal connected to a charge collector of the electric storage element and exposed to an outside of the hard casing is provided. The electric storage cell is chargeable/dischargeable using the electrode terminal, wherein the electrode terminal has a charge collector connecting portion connected to the charge collector through an opening formed in the hard casing, and a main body bonded to an outer circumferential surface of the hard casing to make a surface contact.

Embodiments of the present invention and advantages thereof are described in detail below with reference to the accompanying drawings.

EMBODIMENTS OF THE INVENTION

Hereinafter, embodiments of the present invention will be described with reference to the accompanying drawings.

<First Embodiment>

Hereinafter, an electric double layer capacitor 100 (hereinafter, simply referred to as a capacitor) serving as an electric storage cell according to a first embodiment of the present invention will be described with reference to FIGS. 1 to 5.

Figure 1:
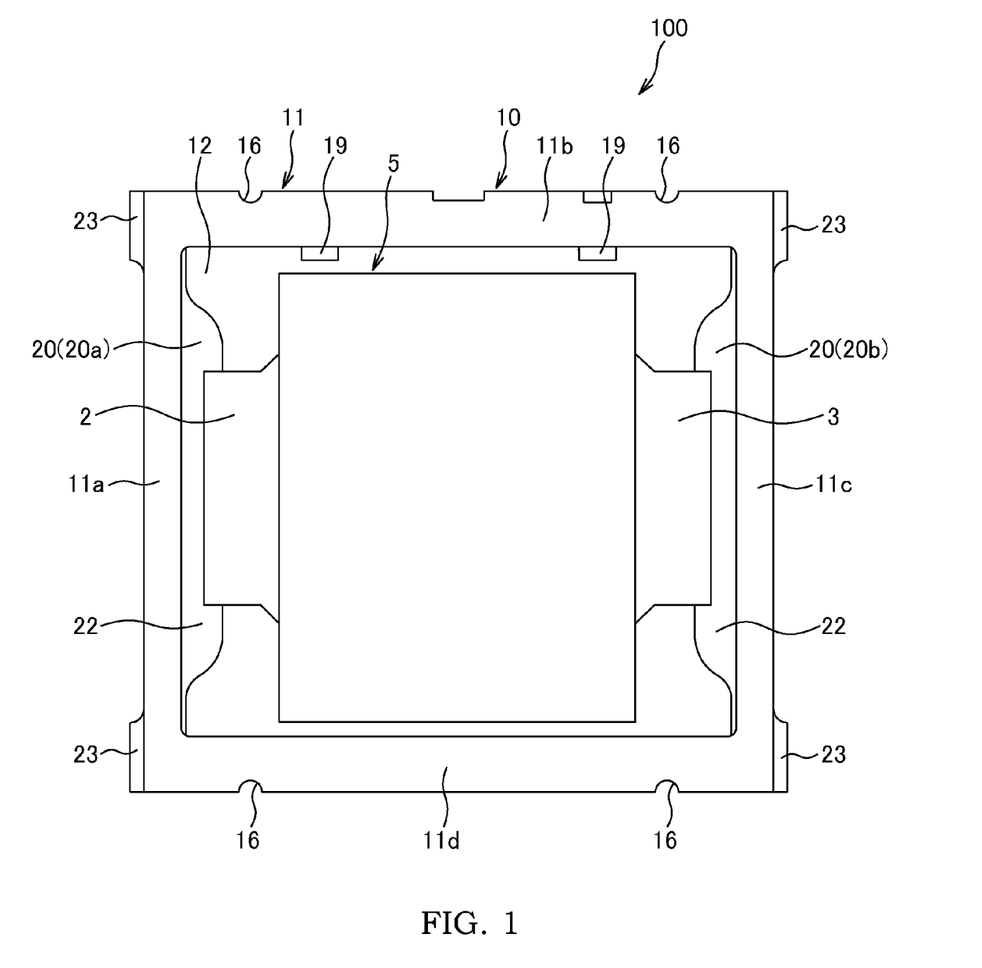
FIG. 1 is a front view illustrating an electric double layer capacitor according to a first embodiment of the present invention, in which a film on a surface of the rectangular chassis is removed.

As illustrated in FIG. 1, the capacitor 100 includes a hard casing 10 configured to house an electric storage element 5 that stores electric charges and electrolyte and a pair of electrode terminals 20 connected to the electric storage element 5 and exposed to the outside of the hard casing 10.

The electric storage element 5 is a layered product obtained by laminating a predetermined number of layers including a positive charge collector 2, a negative charge collector 3, and a separator (not illustrated) interposed between the positive and negative charge collectors 2 and 3 to separate both of them.

The separator hinders a contact between the positive and negative charge collectors 2 and 3, but does not obstruct circulation of ions. The separator is a sheet made of paper or resin. Activated carbons constituting an electric double layer are coated on surfaces of the positive and negative charge collectors 2 and 3.

The hard casing 10 includes a rectangular chassis 11 that surrounds the electric storage element 5 and a pair of films 12 bonded to both surfaces of the rectangular chassis 11. FIG. 1 illustrates a state that the film on one surface of the rectangular chassis 11 is removed. The rectangular chassis 11 is made of resin, and the film 12 is a laminate film. The laminate film is a multi-layered film material obtained by laminating a resin layer on a metal layer such as a metal foil. The rectangular chassis 11 and the film 12 are hermetically bonded to each other by thermally welding thermoplastic resin. As a result, the electrolyte in the hard casing 10 is hermetically encapsulated.

The electrode terminal 20 includes a positive electrode terminal 20a electrically connected to the positive charge collector 2 and a negative electrode terminal 20b electrically connected to the negative charge collector 3.

The capacitor 100 stores electric charges and discharges the stored electric charges using the electrostatic capacity of the electric double layer in both the positive and negative charge collectors 2 and 3. The charge/discharge operation is performed using the positive and negative electrode terminals 20a and 20b.

Next, the electrode terminal 20 and the rectangular chassis 11 of the hard casing 10 will be described in detail with reference to FIGS. 2 to 5.

Figure 2:
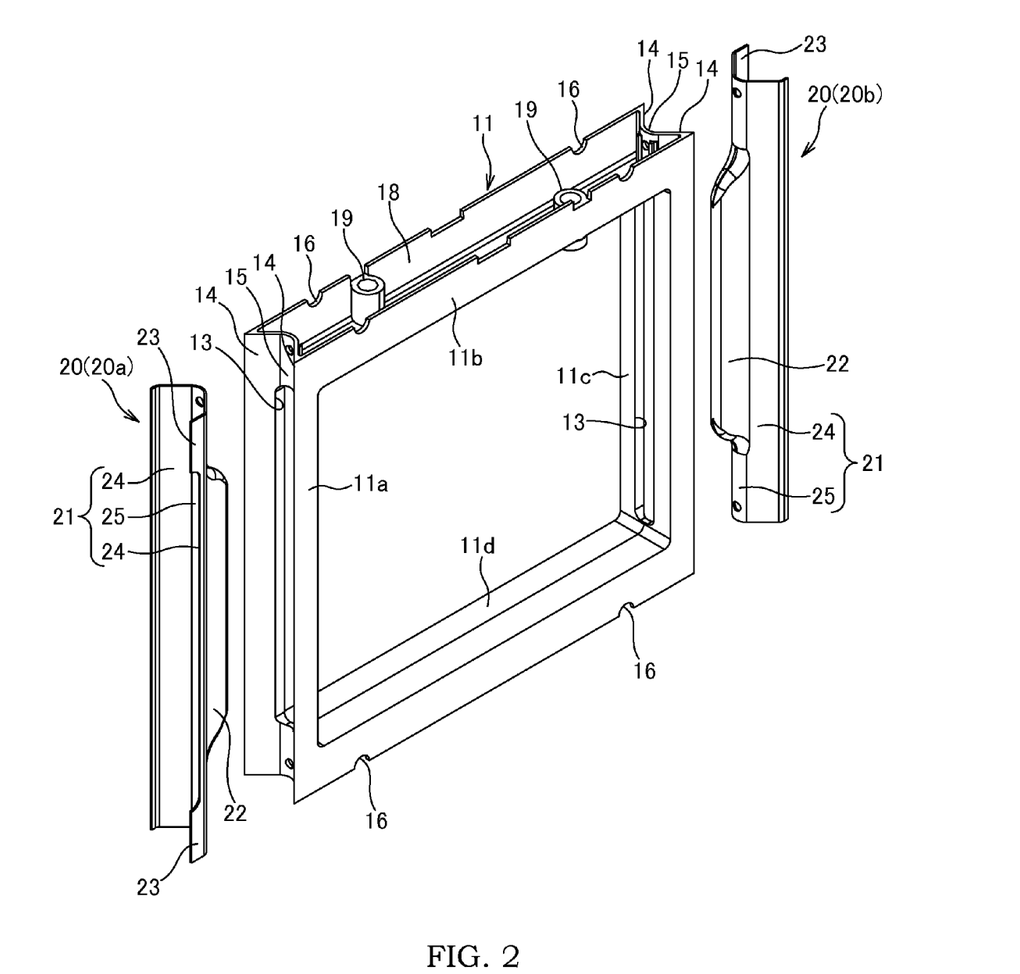
FIG. 2 is an exploded perspective view illustrating a rectangular chassis and an electrode terminal.
Figure 3:
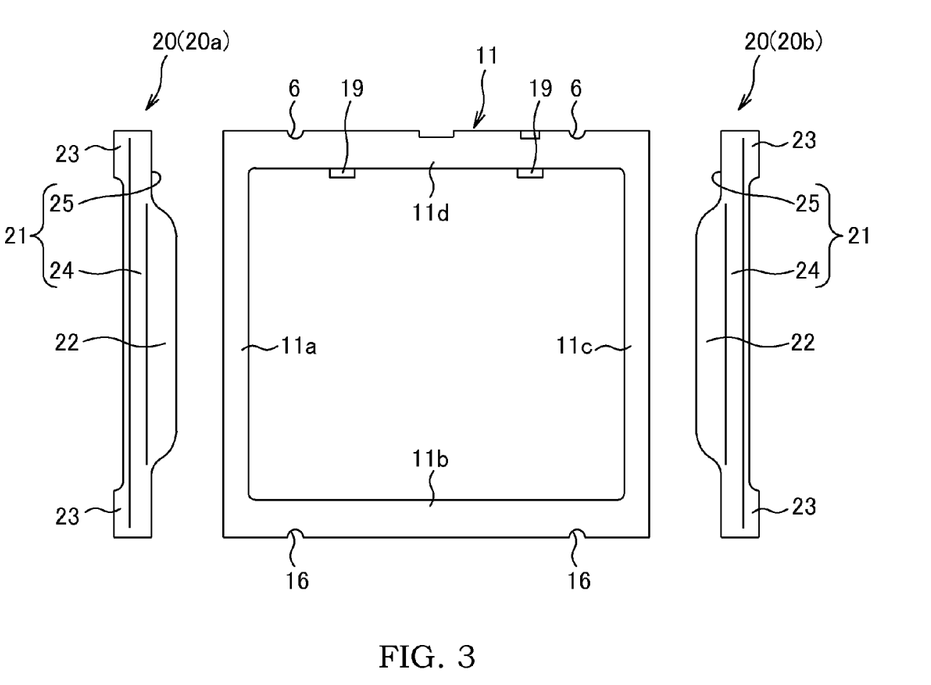
FIG. 3 is a front exploded view illustrating the rectangular chassis and the electrode terminal.

As illustrated in FIGS. 2 and 3, the rectangular chassis 11 is a rectangular bezel-like member including four straight frames 11a to 11d. The rectangular chassis 11 has an inner circumferential surface surrounding the electric storage element 5 and an outer circumferential surface having four sides.

Each of the opposite frames 11a and 11c has an opening 13 penetrating through the rectangular chassis 11. The opening 13 is formed to extend along a longitudinal direction of the frames 11a and 11c.

Figure 4:
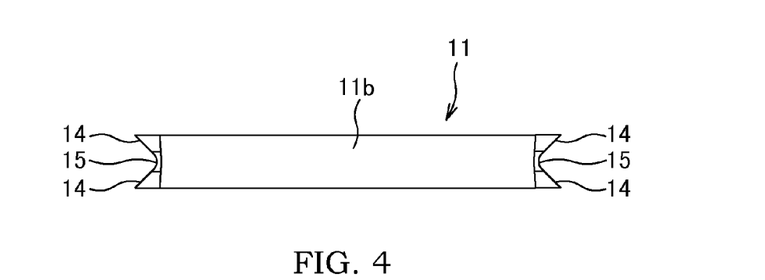
FIG. 4 is a plan view illustrating the rectangular chassis.

As illustrated in FIGS. 2 and 4, the frames 11a and 11c are formed to have an approximately V-shaped hollow as seen in a cross-sectional view. The outer circumferential surfaces of the frames 11a and 11c include a pair of opposite slope faces 14 and a curved bottom 15 linking a pair of slope faces 14 to form a hollow. The opening 13 is formed to extend along the bottom 15. A pair of slope faces 14 functions as a sealing surface with the electrode terminal 20 as described below.

As illustrated in FIG. 2, a trench 18 is formed in the outer circumferential surface of the opposite frames 11b and 11d. In the trench 18, a gas drain valve 19 for discharging the gas generated in the hard casing 10 to the outside or a circuit board (not illustrated) for equalizing a voltage is placed.

The positive electrode terminal 20a is bonded to cover the outer circumferential surface of the frame 11a, and the negative electrode terminal 20b is bonded to cover the outer circumferential surface of the frame 11c. Since the positive and negative electrode terminals 20a and 20b have the same configuration, the positive electrode terminal 20a will be described in the following description.

Figure 5A:
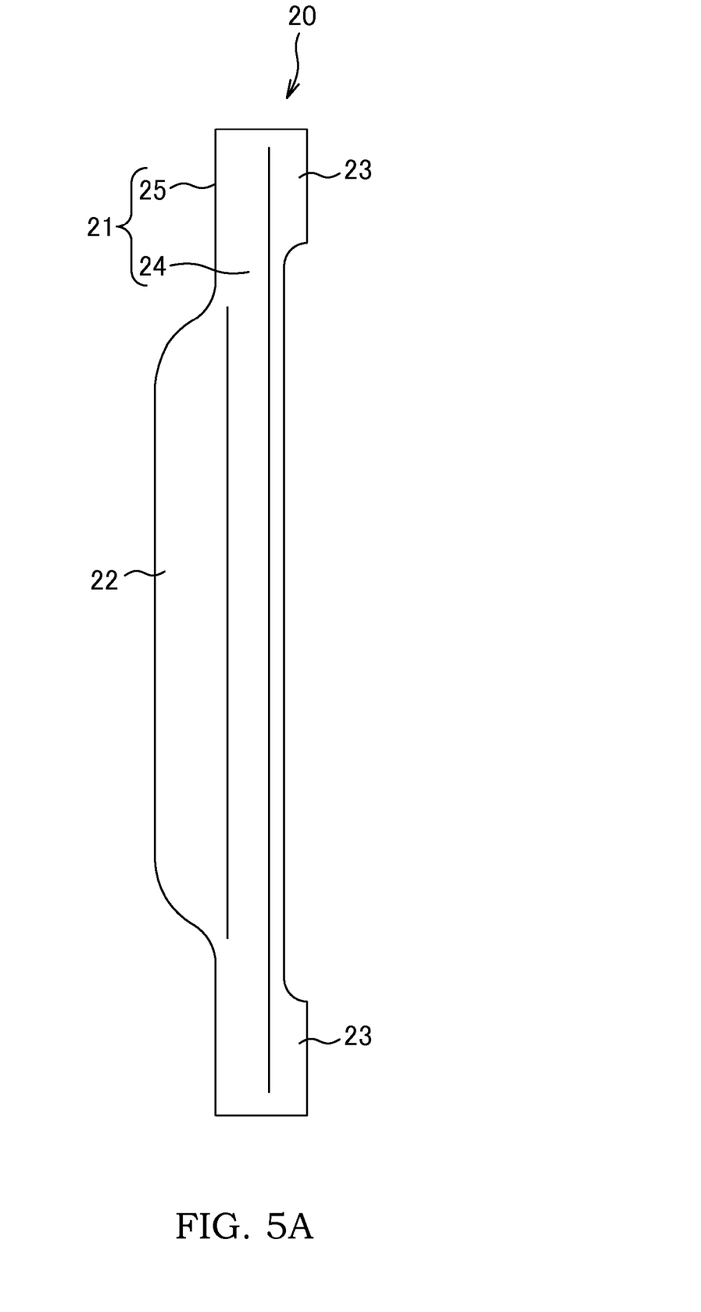
FIG. 5A is a side view illustrating the electrode terminal.
Figure 5B:
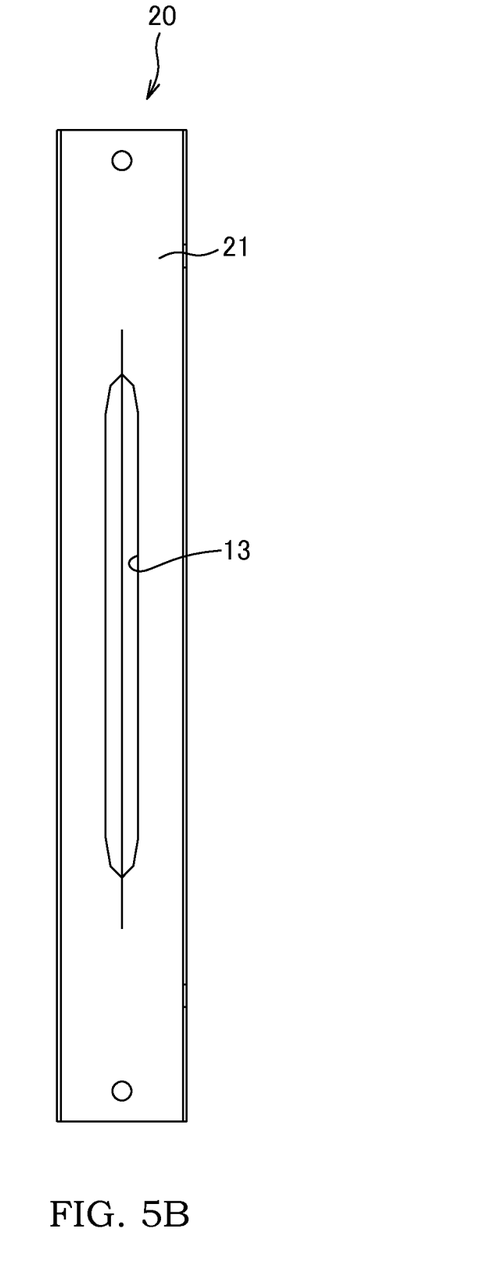
FIG. 5B is a front view illustrating the electrode terminal.

The positive electrode terminal 20a is made of a conductive metal such as aluminum. As illustrated in FIGS. 2 and 5, the positive electrode terminal 20a includes a main body 21 bonded to the slope face 14 of the outer circumferential surface of the frame 11a to make a surface contact and a charge collector connecting portion 22 connected to the positive charge collector 2 through the opening 13. The charge collector connecting portion 22 of the negative electrode terminal 20b is connected to the negative charge collector 3. In addition, the positive electrode terminal 20a also has an external terminal portion 23 connected to a neighboring capacitor 100.

The main body 21 is formed in a shape matching the outer circumferential surface of the frame 11a, that is, in an approximate V-shape as seen in a cross-sectional view to closely fit into the hollow of the frame 11a. Specifically, the main body 21 has a pair of opposite slope portions 24 and a curved portion 25 linking a pair of slope portions 24. The length of the main body 21 is approximately equal to the length of the frame 11a. The outer surfaces of a pair of slope portions 24 function as a sealing surface with a pair of slope faces 14 of the frame 11a. The charge collector connecting portion 22 is formed to bulge from the outer surface of the curved portion 25 of the main body 21.

The outer surfaces of a pair of slope portions 24 are provided with thermoplastic resin with a uniform thickness. The outer surfaces of a pair of slope portions 24 are hermetically bonded to a pair of slope faces 14 of the frame 11a by thermally welding thermoplastic resin. In this manner, the positive electrode terminal 20a and the frame 11a are bonded to each other such that the outer surface of the slope portion 24 and the slope face 14 make a surface contact. While the positive electrode terminal 20a is bonded to the frame 11a, the main body 21 of the positive electrode terminal 20a covers the entire outer circumferential surface of the frame 11a. Similarly, the main body 21 of the negative electrode terminal 20b covers the entire outer circumferential surface of the frame 11c. In this manner, out of four sides of the outer circumferential surface of the hard casing 10, two sides of the outer circumferential surface are covered by the electrode terminal 20. In addition, while the positive electrode terminal 20a is bonded to the frame 11a, the charge collector connecting portion 22 is inserted into the opening 13 to extend inside the rectangular chassis 11.

It is preferable that the thermoplastic resin used to bond the positive electrode terminal 20a to the frame 11a is a similar type to that of the thermoplastic resin of the frame 11a. In this configuration, the thermal welding is facilitated, so that sealing performance between the outer surface of the slope portion 24 and the slope face 14 is improved. Alternatively, without providing the thermoplastic resin between the positive electrode terminal 20a and the frame 11a, the positive electrode terminal 20a and the frame 11a may be directly bonded to each other using the thermoplastic resin of the frame 11a.

In general, a heat amount of the capacitor is small relative to a chemical battery that uses a chemical reaction. However, it is necessary to discharge the heat in the casing generated by the charge/discharge operation of the electric storage element 5 to the outside. Since the electrode terminal 20 is bonded to the negative and positive charge collectors 3 and 2 of the electric storage element and is exposed to the outside of the hard casing 10, the electrode terminal 20 can function as a member for radiating the heat in the hard casing 10. That is, the surface of the electrode terminal 20 exposed to the outside functions as a heat radiation surface. In the capacitor 100, each of the main bodies 21 of the negative and positive electrode terminals 20b and 20a covers one side of the outer circumferential surface out of four sides of the outer circumferential surface of the hard casing 10. Therefore, the surface area of the electrode terminal 20 is large. In addition, since the main body 21 of the electrode terminal 20 has a V-shape, a surface area is large relative to a flat electrode terminal. In this manner, since the electrode terminal 20 has a large surface area exposed to the outside, it is possible to facilitate external heat exchange. Therefore, the heat in the hard casing 10 is effectively discharged to the outside through the electrode terminal 20. Since the electrode terminal 20 has a large surface area, it is not necessary to separately provide a heat radiation device in the capacitor 100. Therefore, it is possible to configure the capacitor 100 with a compact size and a light weight.

As illustrated in FIGS. 2 and 3, the external terminal portion 23 is protrudingly provided in the side edge of the slope portion 24 of the main body 21. Specifically, a pair of external terminal portions are provided in both ends in the longitudinal direction of the slope portion 24. In order to overlappingly connecting a plurality of capacitors 100 in series or in parallel, neighboring capacitors 100 are connected to each other using the external terminal portion 23. In the capacitor 100, each of the main bodies 21 of the negative and positive electrode terminals 20b and 20a covers one side of the outer circumferential surface out of four sides of the outer circumferential surface of the hard casing 10. Therefore, the main bodies 21 of the electrode terminals 20 of the neighboring capacitors 100 adjoin each other just by overlappingly arranging the capacitors 100. By connecting the adjoining main bodies 21 using the external terminal portions 23, it is possible to connect the neighboring capacitors 100 to each other. In this manner, a connecting distance between the neighboring capacitors 100 is significantly short. Therefore, it is possible to connect a plurality of capacitors 100 with a low resistance.

As described above, according to the first embodiment, it is possible to obtain the following effects.

The main body 21 of the electrode terminal 20 is boned to the outer circumferential surface of the hard casing 10 to make a surface contact. In addition, the main body 21 covers two sides of the outer circumferential surface out of four sides of the outer circumferential surface of the hard casing 10. Therefore, the surface area of the electrode terminal 20 exposed to the outside is large. Since the main body 21 of the electrode terminal 20 has a V-shape, the surface area of the electrode terminal 20 is large. Therefore, it is possible to effectively discharge the heat generated in the hard casing 10 due to the charge/discharge operation of the electric storage element 5 to the outside through the electrode terminal 20. As a result, a temperature increase of the capacitor 100 is prevented. Therefore, it is possible to improve reliability of the capacitor 100 and lengthen a service life of the capacitor 100.

Since the surface area of the electrode terminal 20 is large, it is not necessary to separately provide a heat radiation device in the capacitor 100. The electrode terminal 20 functions as a heat radiation device as well as an electrical passage. Therefore, it is possible to configure the capacitor 100 with a compact size and a light weight.

Since each of the main bodies 21 of the negative and positive electrode terminals 20b and 20a covers one side of the outer circumferential surface out of four sides of the outer circumferential surface of the hard casing 10, a connecting distance between neighboring capacitors 100 is significantly short. Therefore, it is possible to connect a plurality of capacitors 100 with a low resistance.

The electrode terminal 20 and the hard casing 10 are bonded to each other through a surface contact between the outer surface of the slope portion 24 and the slope face 14. Therefore, sealing performance is improved. In addition, the slope portion 24 of the electrode terminal 20 and the slope face 14 of the outer circumferential surface of the hard casing 10 serving as a sealing surface are formed to have an inclination, a sealing area is large. Therefore, it is possible to improve sealing performance in a small space and obtain a highly-hermetical capacitor 100 capable of preventing liquid leakage from the vicinity of the electrode terminal 20 or external gas intrusion.

While the description has been made for a case where the electric storage cell is a capacitor in the first embodiment, the electric storage cell may be any one of other types of electric storage cells such as a nickel hydrogen battery or a lithium ion battery.

In the description of the first embodiment, the hard casing 10 includes the rectangular chassis 11 made of resin and the film 12 as a laminate film. However, the configuration of the hard casing 10 is not limited thereto. For example, the entire hard casing 10 may be made of resin.

In the description of the first embodiment, the opening 13 is formed to penetrate through each of the opposite frames 11a and 11c, the positive electrode terminal 20a is bonded to cover the outer circumferential surface of the frame 11a, and the negative electrode terminal 20b is bonded to cover the outer circumferential surface of the frame 11c. Alternatively, two openings 13 may be formed side by side along a longitudinal direction in one of the four frames 11a to 11d, for example, the frame 11a, and the positive electrode and negative electrode terminals 20a and 20b may be provided side by side in the outer circumferential surface of the frame 11a. In this case, the main body 21 of the electrode terminal 20 covers one side of the outer circumferential surface out of four sides of the outer circumferential surface of the hard casing 10, and remaining three sides of the outer circumferential surface do not function as a heat radiation surface.

<Second Embodiment>

Hereinafter, an electric storage apparatus 200 according to a second embodiment of the present invention will be described with reference to FIGS. 6 to 8.

Figure 6:
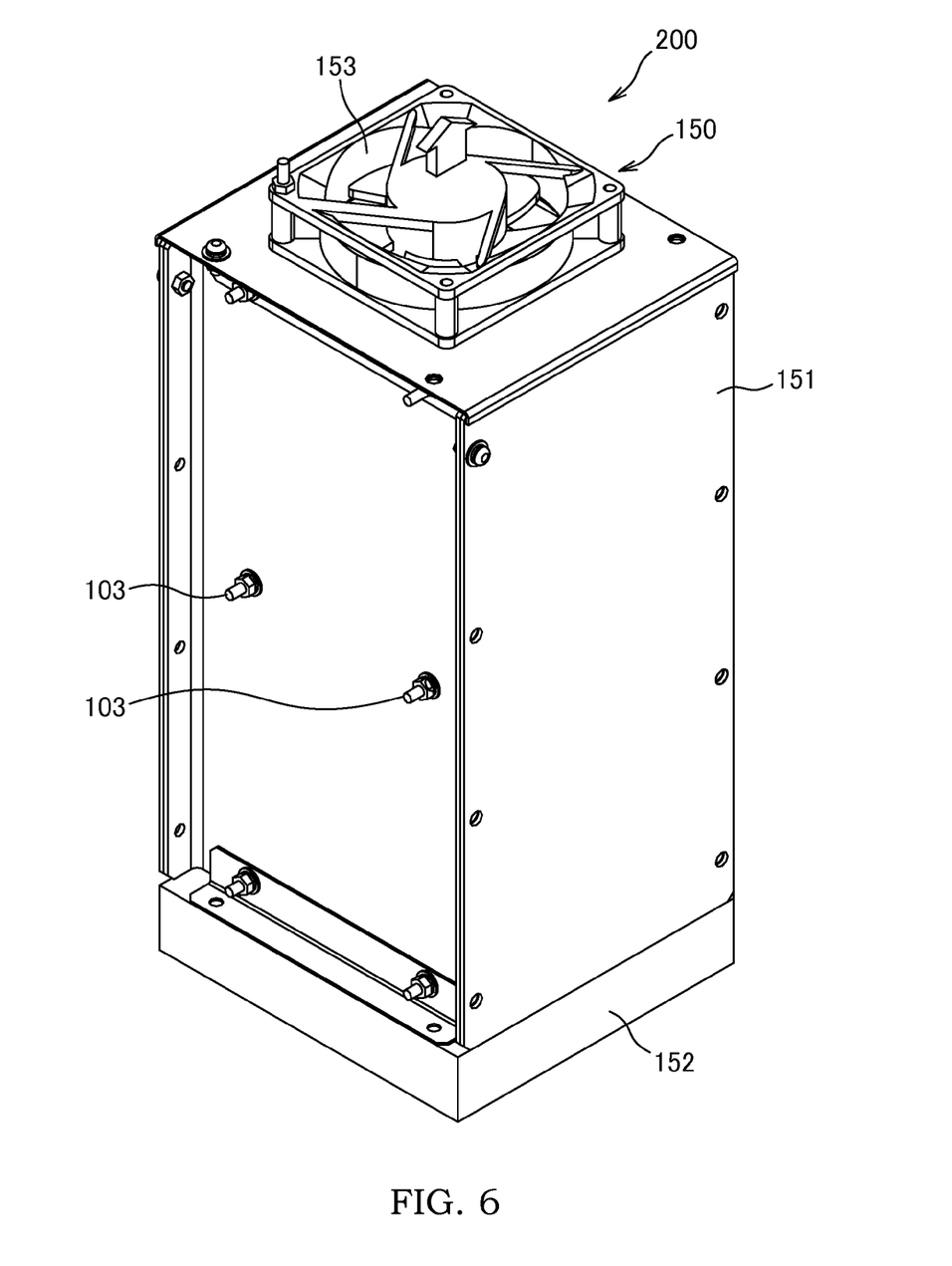
FIG. 6 is a perspective view illustrating an electric storage apparatus according to a second embodiment of the present invention.
Figure 7:
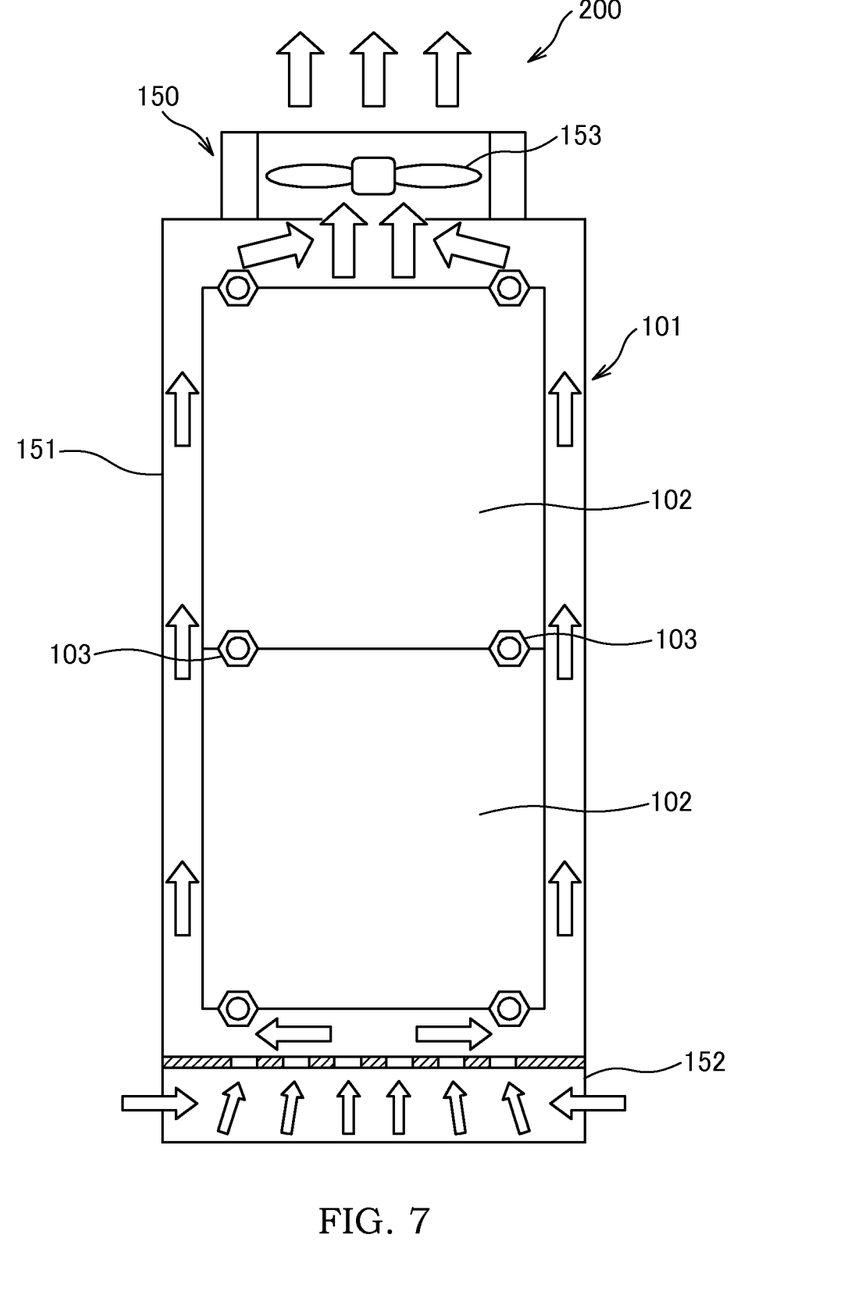
FIG. 7 is a schematic diagram illustrating a cooling air flow in the electric storage apparatus.
Figure 8:
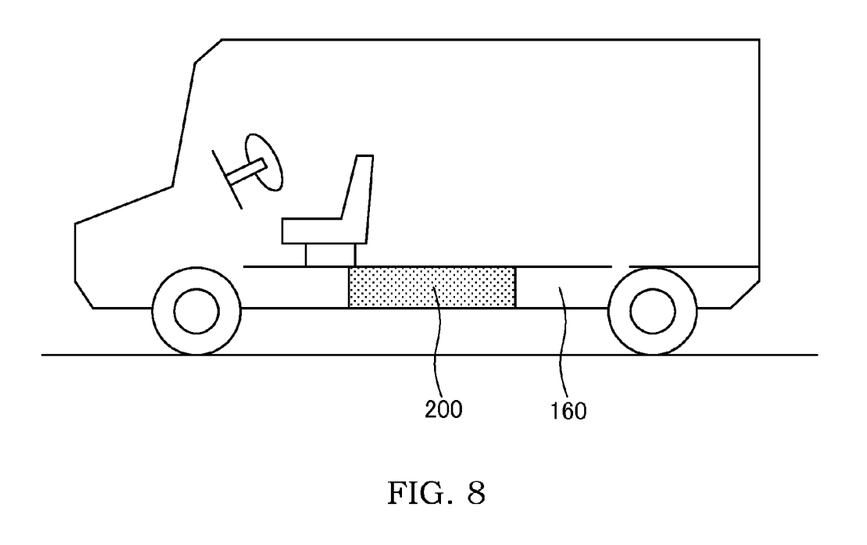
FIG. 8 is a schematic diagram illustrating a vehicle having the electric storage apparatus.

As illustrated in FIGS. 6 and 7, the electric storage apparatus 200 includes a battery module 101 obtained by stacking a plurality of the capacitors 100 according to the first embodiment and a cooler 150 for cooling the battery module 101.

A unit module is obtained by stacking a plurality of capacitors 100 along a thickness direction. The battery module 101 is formed by overlapping a pair of unit modules 102 such that the hollows of the main bodies 21 of the electrode terminals 20 are successively linked.

Each of the opposite frames 11b and 11d of the hard casing 10 has a pair of semicircular notches 16 (refer to FIGS. 2 and 3). By overlapping a pair of unit modules 102, the notches 16 forms a bolt fastening hole in the frames 11b and 11d. A pair of unit modules 102 are fixed by inserting and fastening a bolt 103 into the bolt fastening hole.

The cooler 150 is an apparatus for cooling the battery module 101 using the air. The cooler 150 includes a casing 151 configured to house the battery module 101, an inlet duct 152 opened in a lower portion of the casing 151 for guiding the air to the inside of the casing 151, and an air blower 153 provided in an upper portion of the casing 151 to guide the air input through the inlet duct 152 along the hollows of the main bodies 21 of the electrode terminals 20.

Since the battery module 101 is arranged such that the hollows of the main bodies 21 of the electrode terminals 20 are successively linked along a vertical direction, the air guided to the casing 151 by the air blower 153 is discharged to the outside through the hollows of the main bodies 21. In this manner, the air guided to the inside of the casing 151 flows by making contact with the main body 21 of the electrode terminal 20, it is possible to facilitate heat radiation through the electrode terminal 20 and effectively cool the battery module 101. It is noted that the battery module 101 is obtained by arranging a pair of unit modules 102 along a vertical direction, so that a pair of unit modules 102 are cooled using a single air blower 153. Therefore, compared to a case where the air blower 153 is provided for each unit module 102, it is possible to configure the electric storage apparatus 200 with a compact size.

Since the main body 21 of the electrode terminal 20 is formed to have a hollow, the cooling air can pass through the inside of the hollow of the main body 21 even when a gap between the inner wall of the casing 151 and the electrode terminal 20 is small. That is, the passage of the cooling air provided in the casing 151 may have a minimum necessary size. Therefore, it is possible to form the casing 151 in a size nearly equal to that of the battery module 101. Accordingly, it is possible to configure the electric storage apparatus 200 with a compact size and a light weight. In addition, it is possible to increase a ratio of the space contributing to a battery functionality out of the entire space of the electric storage apparatus 200. Therefore, it is possible to obtain an electric storage apparatus 200 having excellent electric storage efficiency.

As described above in the first and second embodiments, the electrode terminal 20 of the capacitor 100 has a large surface area. Therefore, it is not necessary to separately provide a heat radiation device, and the hollow of the main body 21 of the electrode terminal 20 functions as a cooling air passage. Therefore, it is possible to configure the electric storage apparatus 200 with a compact size. As described in the second embodiment, it is possible to suppress a height of the electric storage apparatus 200 from increasing even when the battery module 101 is configured by arranging a pair of unit modules 102 along a vertical direction.

In this manner, the electric storage apparatus 200 has a low height. Therefore, in a case where the electric storage apparatus 200 is mounted on a vehicle, the electric storage apparatus 200 may be stored in an underfloor space of a vehicle as illustrated in FIG. 8. In other words, it is possible to implement a vehicle having a low floor position.

This invention is not limited to the embodiment described above, and may be subjected to various modifications within the scope of the technical spirit thereof.

With respect to the above description, the contents of application No. 2010-270422, with a filing date of Dec. 3, 2010 in Japan, are incorporated herein by reference.

The invention claimed is:

1. An electric storage cell, comprising:
a hard casing configured to house an electric storage element and electrolyte;
a positive electrode terminal electrically connected to a positive charge collector of the electric storage element; and
a negative electrode terminal electrically connected to a negative charge collector of the electric storage element, the electric storage cell being chargeable/dischargeable using the positive and negative electrode terminals and the positive and negative charge collectors,
wherein
the hard casing includes
a chassis that surrounds the electric storage element, and
a pair of films bonded to both surfaces of the chassis, and
each of the positive and negative electrode terminals has
a charge collector connecting portion connected to the corresponding charge collector of the electric storage element through an opening of the hard casing, and
a main body exposed to an outside of the hard casing and bonded to an outer circumferential surface of the hard casing to make a surface contact with the outer circumferential surface of the hard casing.

2. The electric storage cell according to claim 1, wherein the hard casing has a rectangular shape,
the main body of each of the negative and positive electrode terminals is bonded to cover the outer circumferential surface on one side out of four sides of the rectangular shape of the hard casing.

3. The electric storage cell according to claim 1, wherein the outer circumferential surface of the hard casing where the main body of each of the positive and negative electrode terminals is bonded has a hollow, and the main body of each of the positive and negative electrode terminals has a shape matching the hollow of the outer circumferential surface of the hard casing.

4. The electric storage cell according to claim 1, wherein the outer circumferential surface of the hard casing where the main body of each of the positive and negative electrode terminals is bonded has a pair of opposite slope faces and a bottom that links the pair of slope faces, and
the main body of each of the positive and negative electrode terminals is bonded to the pair of slope faces to make a surface contact with the slope faces.

5. The electric storage cell according to claim 4, wherein the main body of each of the positive and negative electrode terminals has a pair of opposite slope portions and a curved portion that links the pair of slope portions,
outer surfaces of the pair of slope portions are bonded to the pair of slope faces of the outer circumferential surface of the hard casing to make a surface contact with the slope faces, and
the charge collector connecting portion of said each of the positive and negative electrode terminals has a bulge extending from an outer surface of the curved portion.

6. The electric storage cell according to claim 5, wherein each of the positive and negative electrode terminals further has an external terminal portion for connection with a neighboring electric storage cell, and the external terminal portion is protruding from a side edge of one of the slope portions of the main body.

7. An electric storage apparatus comprising:
a battery module obtained by stacking a plurality of the electric storage cells according to claim 1; and
a cooler configured to cool the battery module.

8. An electric storage apparatus, comprising:
a battery module obtained by stacking a plurality of the electric storage cells according to claim 3; and
a cooler configured to cool the battery module,
wherein the cooler has
a casing configured to store the battery module,
an inlet duct opened in the casing and configured to guide air to an inside of the casing, and an air blower configured to force the air input through the inlet duct along a hollow of the main body of each of the positive and negative electrode terminals.

9. The electric storage apparatus according to claim 8, wherein the battery module has overlapping unit modules obtained by stacking the plurality of the electric storage cells along a thickness direction such that the hollows of the main bodies of the electrode terminals are successively linked.

10. A vehicle having the electric storage apparatus according to claim 7.

* * * * *